United States Patent
Jiang et al.

(10) Patent No.: US 11,740,628 B2
(45) Date of Patent: Aug. 29, 2023

(54) SCENARIO BASED CONTROL OF AUTONOMOUS DRIVING VEHICLE

(71) Applicant: Baidu USA LLC, Sunnyvale, CA (US)

(72) Inventors: Shu Jiang, Sunnyvale, CA (US); Qi Luo, Sunnyvale, CA (US); Jinghao Miao, Sunnyvale, CA (US); Jiangtao Hu, Sunnyvale, CA (US); Yu Wang, Sunnyvale, CA (US); Jinyun Zhou, Sunnyvale, CA (US); Jiaming Tao, Sunnyvale, CA (US); Xiangquan Xiao, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 194 days.

(21) Appl. No.: 16/823,066

(22) Filed: Mar. 18, 2020

(65) Prior Publication Data
US 2021/0294324 A1    Sep. 23, 2021

(51) Int. Cl.
G05D 1/00     (2006.01)
B62D 15/02    (2006.01)
G05D 1/02     (2020.01)

(52) U.S. Cl.
CPC ....... *G05D 1/0088* (2013.01); *B62D 15/0285* (2013.01); *G05D 1/0223* (2013.01); *G05D 1/0274* (2013.01); *G05D 2201/0212* (2013.01); *G05D 2201/0213* (2013.01)

(58) Field of Classification Search
CPC .. G05D 1/0088; G05D 1/0223; G05D 1/0274; G05D 2201/0212; G05D 2201/0213; B62D 15/0285; B60W 10/04; B60W 10/184; B60W 10/20; B60W 30/18036; B60W 2050/0095; B60W 2520/10; B60W 2552/05; B60W 2552/53; B60W 2556/50; B60W 30/182; B60W 60/001; B60W 30/06; B60W 60/0011; B60W 40/02; B60W 40/105; B60W 60/007; B60W 2050/0002; B60W 2556/45
USPC .......................................... 701/25
See application file for complete search history.

(56) References Cited

U.S. PATENT DOCUMENTS

| | | | |
|---|---|---|---|
| 11,157,003 B1* | 10/2021 | Patel | G08G 5/0013 |
| 2015/0032293 A1* | 1/2015 | O'Neill | G05D 1/0088 |
| | | | 701/2 |
| 2015/0259007 A1* | 9/2015 | Di Cairano | B62D 6/003 |
| | | | 701/41 |

(Continued)

FOREIGN PATENT DOCUMENTS

| | | | |
|---|---|---|---|
| CN | 106372758 A | 2/2017 | |
| CN | 110579216 A | 12/2019 | |

(Continued)

*Primary Examiner* — Vivek D Koppikar
*Assistant Examiner* — Dominick Mulder
(74) *Attorney, Agent, or Firm* — Womble Bond Dickinson (US) LLP

(57) ABSTRACT

In one embodiment, control of an autonomous driving vehicle (ADV) includes determining a current scenario of the ADV. Based on the scenario, a control algorithm is selected among a plurality of distinct control algorithms as the active control algorithm. One or more control commands are generated using the active control algorithm, based one or more target inputs. The control commands are applied to effect movement of the ADV.

20 Claims, 8 Drawing Sheets

(56) References Cited

U.S. PATENT DOCUMENTS

| | | | |
|---|---|---|---|
| 2016/0129908 A1* | 5/2016 | Harda | B60W 30/146 |
| | | | 701/24 |
| 2016/0187880 A1* | 6/2016 | Chen | B60W 40/09 |
| | | | 701/27 |
| 2016/0236680 A1* | 8/2016 | Lavoie | B62D 15/0285 |
| 2017/0277188 A1 | 9/2017 | Xu et al. | |
| 2018/0059672 A1 | 3/2018 | Li et al. | |
| 2019/0079514 A1 | 3/2019 | Zhu | |
| 2019/0086924 A1* | 3/2019 | Greenfield | B60W 30/00 |
| 2020/0259924 A1* | 8/2020 | Lee | H04M 15/66 |
| 2020/0269875 A1* | 8/2020 | Wray | G01C 21/3446 |
| 2020/0353943 A1* | 11/2020 | Siddiqui | G06N 3/045 |
| 2020/0406906 A1* | 12/2020 | Omari | B60W 50/0098 |
| 2021/0116907 A1* | 4/2021 | Altman | H04W 4/44 |
| 2021/0197798 A1* | 7/2021 | Funke | B60W 30/06 |
| 2021/0213941 A1* | 7/2021 | Fukasawa | B60W 30/06 |
| 2021/0245778 A1* | 8/2021 | Suzuki | B60W 50/06 |

FOREIGN PATENT DOCUMENTS

| | | | |
|---|---|---|---|
| CN | 110879560 A | 3/2020 | |
| EP | 3598260 A1 | 1/2020 | |
| JP | 2001048033 A | 2/2001 | |
| JP | 2004276641 A | 10/2004 | |
| JP | 2018081080 A | 5/2018 | |
| JP | 2019194081 A | 11/2019 | |
| JP | 2020017271 A | 1/2020 | |
| KR | 1020190093729 A | 8/2019 | |
| WO | 2019088989 A1 | 5/2019 | |
| WO | 2020105620 A1 | 5/2020 | |

* cited by examiner

400

| Application 401 | Planning and Control 402 | Perception 403 | Device Driver(s) 404 | Firmware 405 | Hardware 406 |

FIG. 4

SCENARIO BASED CONTROL OF AUTONOMOUS DRIVING VEHICLE

TECHNICAL FIELD

Embodiments of the present disclosure relate generally to operating autonomous vehicles. More particularly, embodiments of the disclosure relate to scenario based control of autonomous vehicles.

BACKGROUND

Vehicles operating in an autonomous mode (e.g., driverless) can relieve occupants, especially the driver, from some driving-related responsibilities. When operating in an autonomous mode, the vehicle can navigate to various locations, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

A vehicle control algorithm can determine how aggressively a target control parameter (e.g., vehicle position, vehicle heading, or velocity) is tracked. Different control algorithms and configurations may be desirable under different driving scenarios.

BRIEF DESCRIPTION OF THE DRAWINGS

Embodiments of the disclosure are illustrated by way of example and not limitation in the figures of the accompanying drawings in which like references indicate similar elements.

FIG. 4 shows a block diagram illustrating system architecture for autonomous driving according to one embodiment.

DETAILED DESCRIPTION

Figure 1:
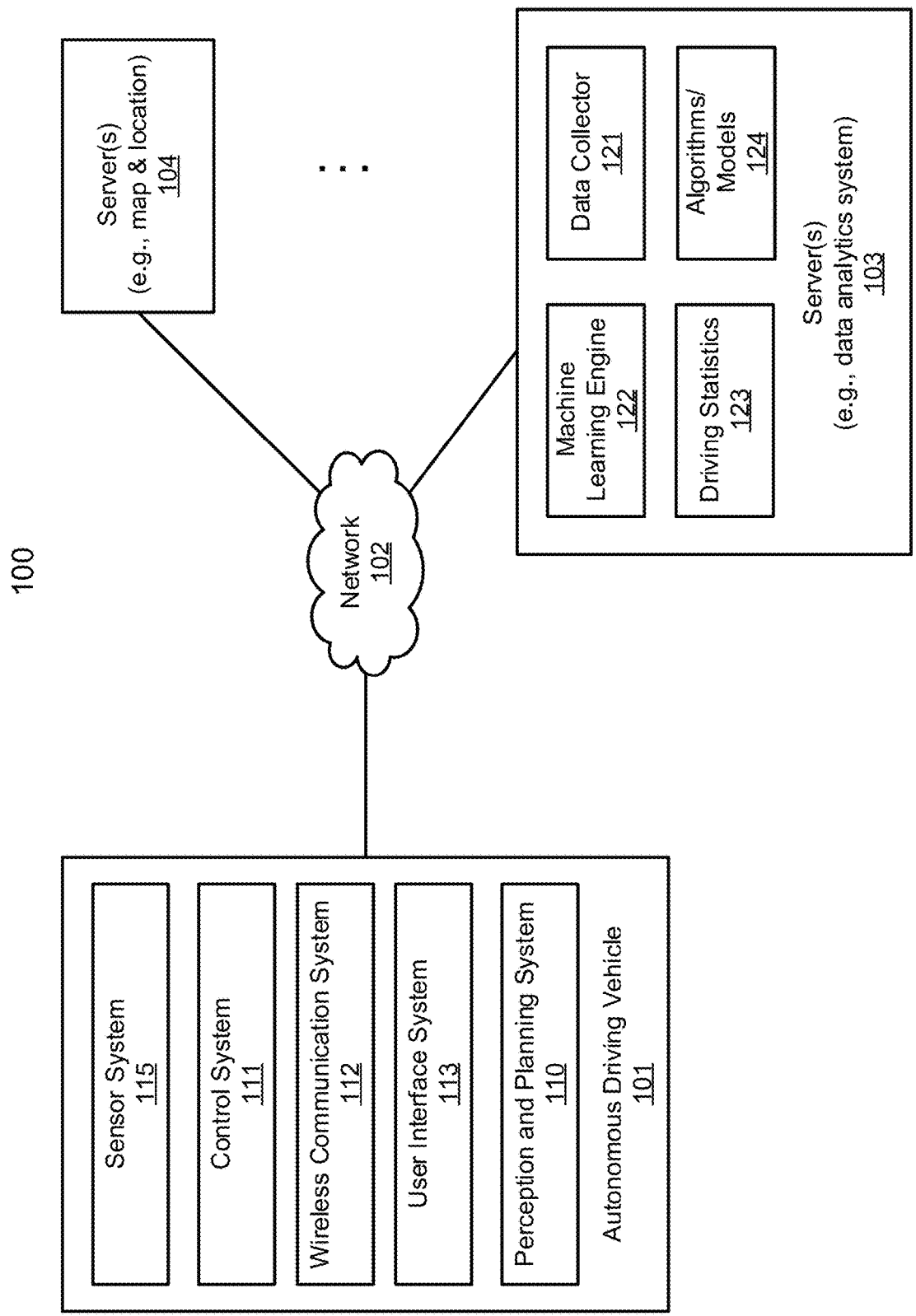
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Different control algorithms and configurations may be desirable under different driving scenarios. For example, in some cases, we may wish for the autonomous driving vehicle to track a target vehicle heading aggressively. In such a case, a control algorithm may generate aggressive changes in a steering command over time to quickly reduce error between the target vehicle heading and a current vehicle heading. In other cases, a control algorithm may want to limit how much a control command can change within a certain amount of time (e.g., from one frame to the next).

According to some embodiments, methods and systems of the present disclosure provide a hot plugging model for an autonomous vehicle's control module. A distinct control algorithm can be 'plugged' into the system based on a current scenario of the autonomous driving vehicle. The current scenario (e.g., a default driving scenario such as an on-lane or in-lane driving scenario, or an open space driving scenario such as a parking scenario) can be determined based on sensed inputs from the vehicle, other than just the speed of the ADV. If speed is the only determinant factor, the control algorithms may be switched too frequently, while not accurately reflecting the ADV's true driving scenario (e.g., a vehicle can slow down even when it is not parking). Thus, a high level decision can be made as to what the ADV's driving scenario is, based on two or more factors.

A control algorithm is selected among a plurality of distinct control algorithms. This control algorithm generates a control command for the ADV based on one or more control target inputs. The control command (e.g., throttle, steering, braking) effects movement of the ADV, tailored to the driving scenario. Thus, under normal driving conditions, the steering might be smooth, not changing too drastically from one moment to the next. Under parking conditions, when the vehicle is moving slower and space may be limited, the steering may be changed more aggressively. While steering is used as an example here, the distinct control algorithms also differ in other respects, as described in other sections of the present disclosure. For the purpose of illustration, a parking scenario is utilized as an example of an open space driving scenario, however, other types of open-space scenarios may also be applicable.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
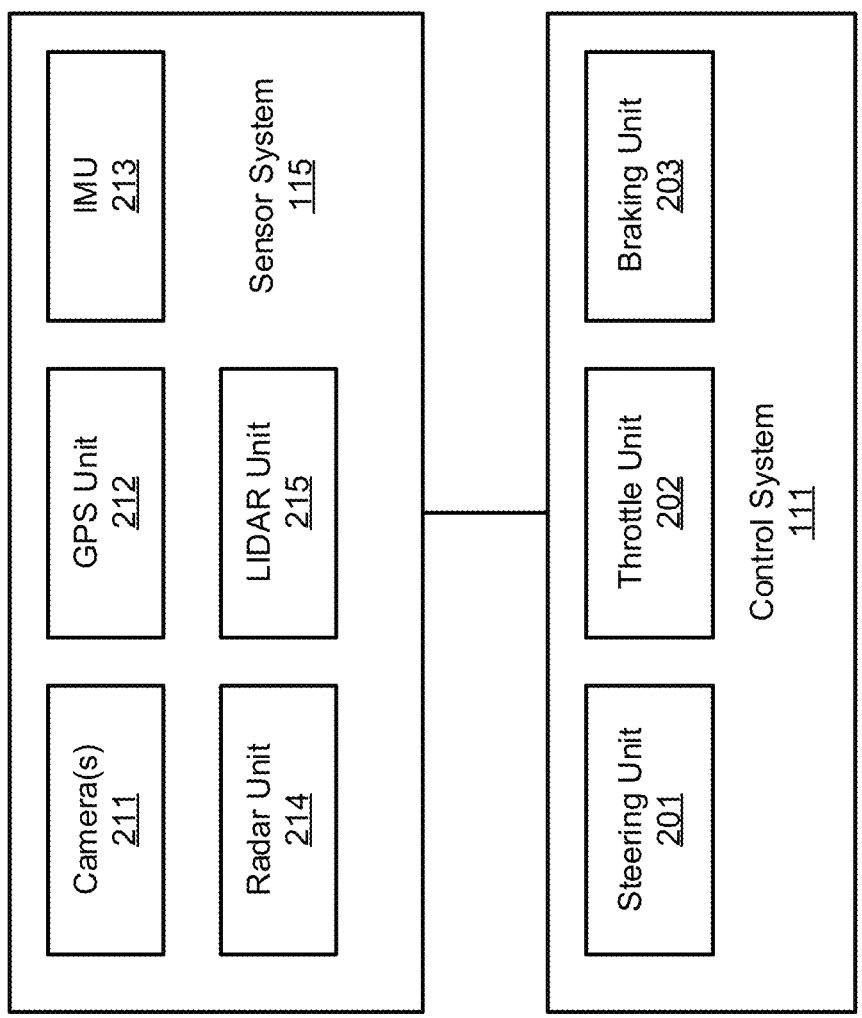
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using Wi-Fi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

The wireless communication system 112 can include a vehicle-to-everything (V2X) communication unit. The communication unit communicates over a wireless communication protocol (e.g., cellular V2X (C-V2X). The communication unit can communicate with other vehicles and devices (V2V or V2I) such as roadside devices or servers, and with a V2X network. The ADV can receive, through the V2X unit, data regarding objects, obstacles (e.g., other vehicles, pedestrians, debris, etc.), road information, and/or map information. This data can be processed by perception and planning system 110, in addition or alternative to the sensor data generated by the ADV's onboard sensors, to assess and perceive the environment around the ADV.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include a plurality of distinct control algorithms corresponding to a number of driving scenarios, as well as an algorithm to determine a current driving scenario based on the perception of the driving environment surrounding an ADV. Algorithms 124 can then be uploaded on ADVs to be utilized during autonomous driving in real-time.

Figure 3A:
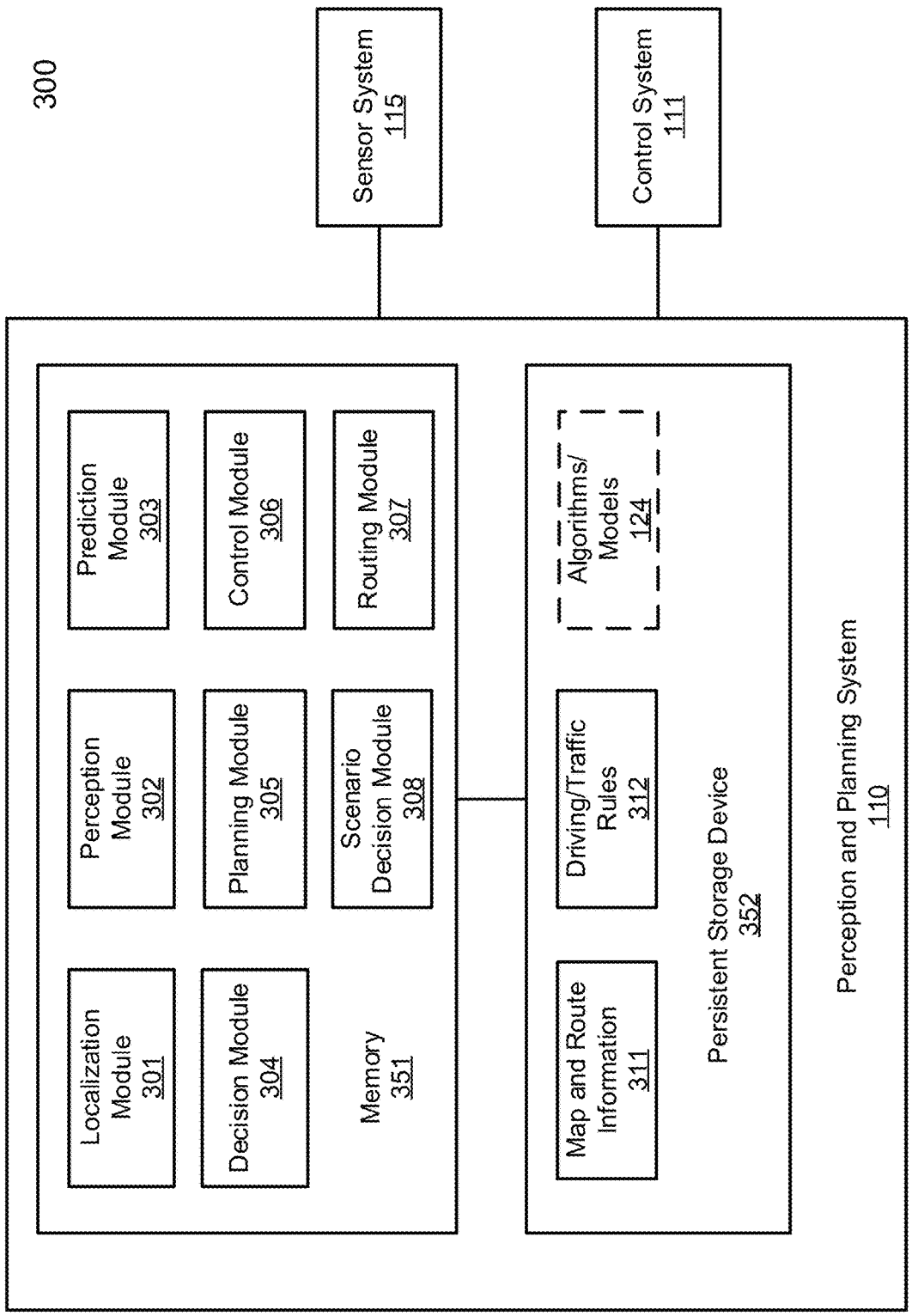
FIGS. 3A-3B are block diagrams illustrating an example of a perception and planning system used with an autonomous vehicle according to one embodiment.
Figure 3B:
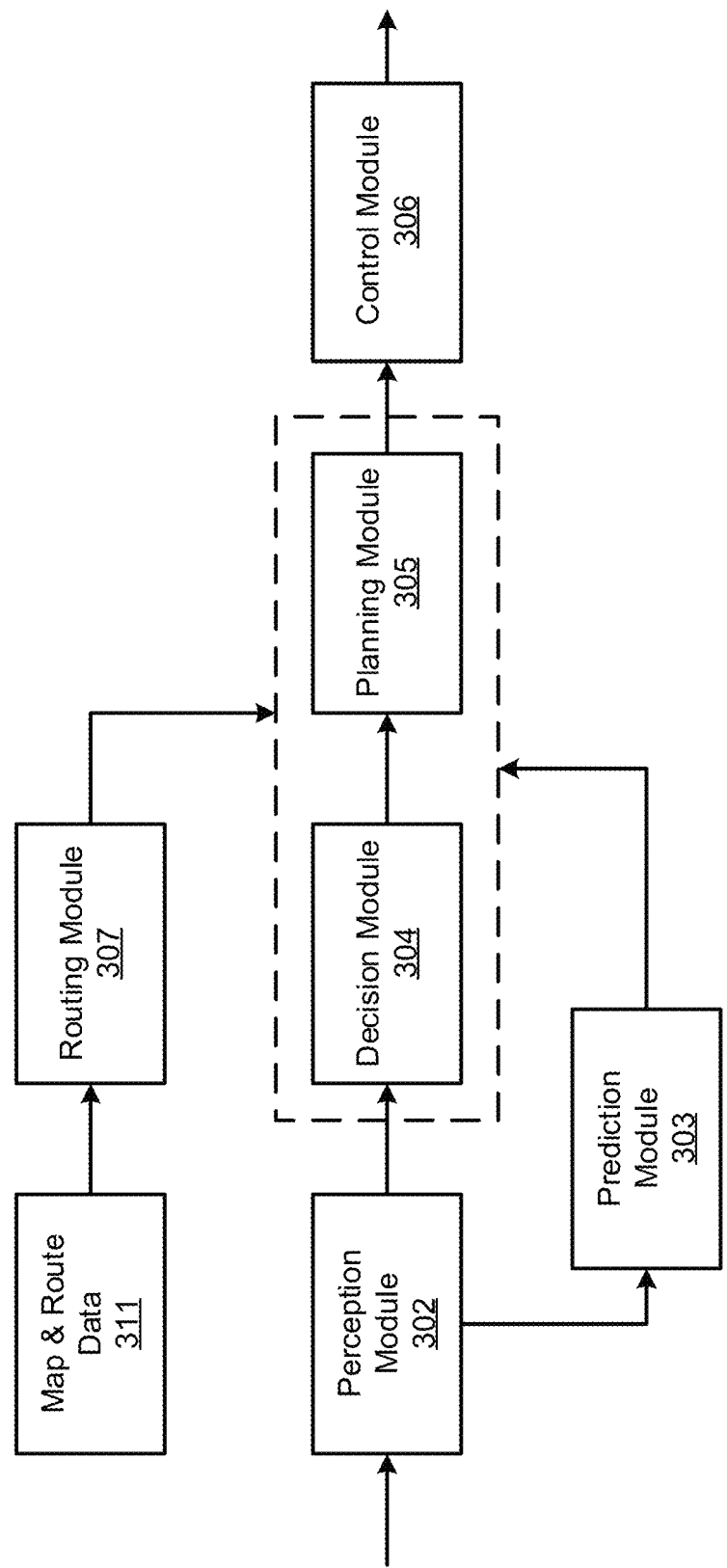

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and scenario decision module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

According to one embodiment, localization module 301 and/or perception module 302 may communicate with other devices such as roadside devices to determine the localization of the vehicle and to perceive a driving environment surrounding the vehicle, in conjunction with the sensor data obtained via the on-board sensors. For example, certain roadside devices disposed along the road may be equipped with sensors, such as, cameras, LIDAR devices, and/or RADAR devices. The roadside devices can include functionality similar to perception module 302 to determine the driving environment of certain road or lane segments, including recognizing the obstacles, traffic lights, etc. Such information can be communicated to the vehicles nearby, for example, via a V2X link. A vehicle can utilize the information received from the roadside devices to perceive the driving environment. Alternatively, the vehicle can combine its own perception process with the perception data received from the roadside devices in perceiving the driving environment.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

In one embodiment, scenario decision module 308 is configured to determine a current driving scenario based on the perception data provided by perception module 302 and/or localization module 301. Based on the current driving scenario, planning module 305 and/or control module may operate in different driving modes such as on-lane mode or open-space mode. In the on-lane mode, the ADV is configured to driving based on lane configuration of the road such as lane markings (e.g., lane lines). In the open-space mode (e.g., parking), the ADV is configured to drive in any direction, including forward and backward, in view of obstacles detected in the current driving environment. Different algorithms may be involved in different driving modes. In control module 306, different controllers (e.g., open-space controller, on-lane controller) may be invoked to perform the corresponding operations. Note that scenario decision module 308 may be implemented as a separate module or integrated with any of modules 301-307, such as, for example, perception module 302.

FIG. 4 is a block diagram illustrating system architecture for autonomous driving according to one embodiment. System architecture 400 may represent system architecture of an autonomous driving system as shown in FIGS. 3A and 3B. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Figure 5:
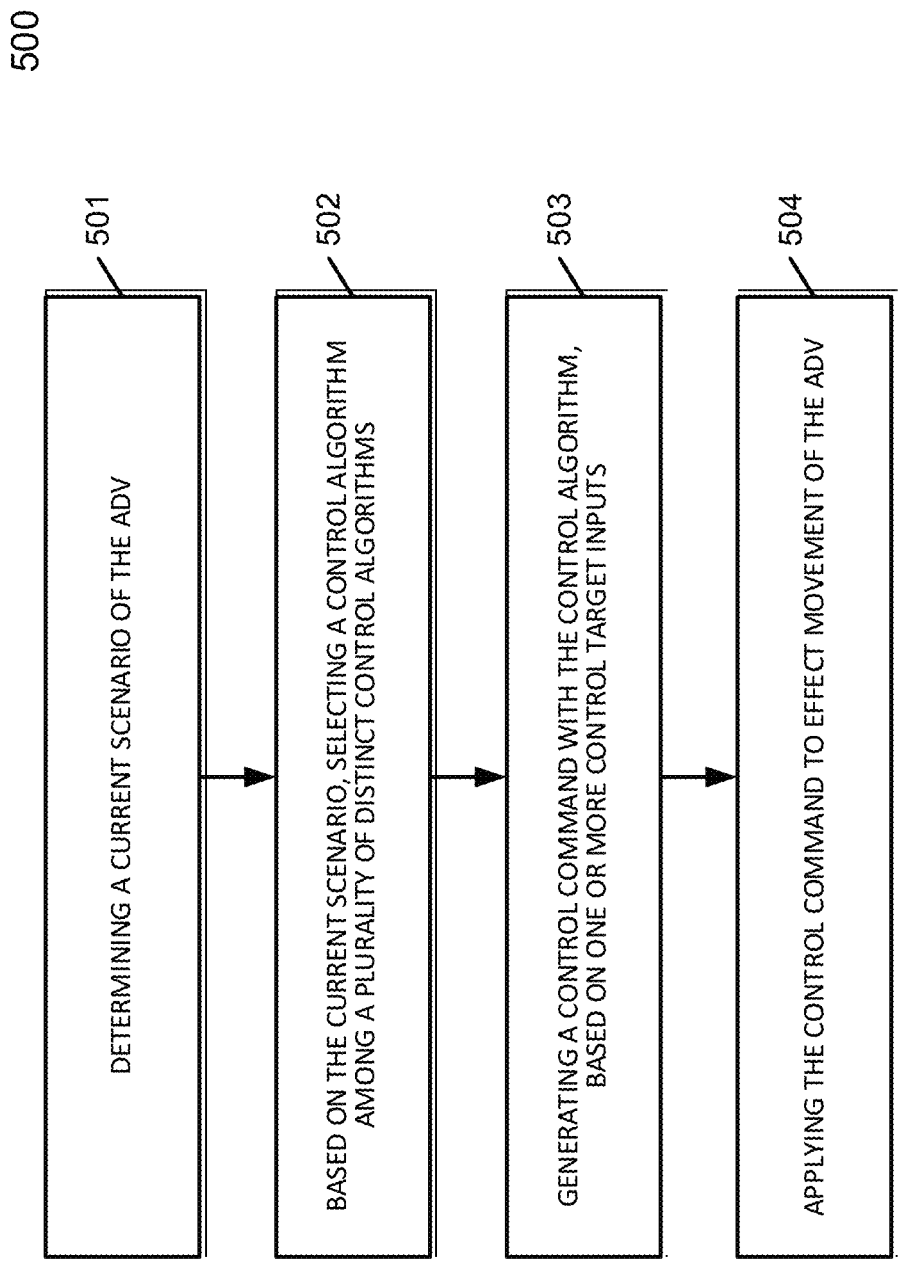
FIG. 5 shows a process for controlling an autonomous driving vehicle based on scenario, according to one embodiment.

Referring to FIG. 5, a process 500 is shown for control of an ADV according to one embodiment. Process 500 may be performed by processing logic which may include software, hardware, or a combination thereof. For example, process 500 may be performed by scenario decision module 308 and control module 306 as described above. Referring to FIG. 5, at block 501, the process includes determining a current scenario of the ADV. The current scenario can be determined based on a driving environment. In some embodiments, the current scenario determination is a high-level determination made based on more than just vehicle speed. In some embodiments, the driving environment with which the scenario is determined based on includes at least two of: map information, current vehicle location, current vehicle path, current vehicle direction, and current vehicle speed. For example, if the current vehicle location is referenced against map information, this might show that the ADV is in a designated parking area (e.g., a parking structure or parking lot). Further, a current vehicle path or direction might indicate that the ADV is entering or exiting a designated parking area. Thus, the scenario can be determined based on such information, at a high level.

At block 502, the process includes selecting a control algorithm, based on the current scenario, from among a plurality of distinct control algorithms. As discussed, a control algorithm may limit or penalize changes in control parameters (e.g., speed, steering) differently, based on the vehicle's current scenario. Thus, according to the vehicle's current scenario, an appropriate and corresponding control algorithm is selected from among the plurality of distinct control algorithms.

At block 503, the process includes generating a control command with the control algorithm, based on one or more control target inputs. The one or more control target inputs can include, for example, include at least one of: a target location of the ADV, a current location of the ADV, a target speed of the ADV, a current speed of the ADV, a target heading of the ADV, and a current heading of the ADV.

Each of the plurality of distinct control algorithms can be associated with a corresponding controller. For example, each of the distinct control algorithms can be encapsulated by its respective controller, e.g., as computer instructions, and/or called upon and executed by the respective controller. The control command can be generated by invoking the controller that corresponds to the current scenario to perform the selected control algorithm. For example, when current scenario is a parking scenario, the parking controller is invoked to generate control commands suitable for parking. When the parking scenario is active, the driving controller is invoked to generate control commands suitable for driving.

At block 504, the process includes applying the control command to effect movement of the ADV. The control command (e.g., throttle command, brake command, or steering command) can be communicated to a corresponding actuator (e.g., a throttle, a brake, or a steering actuator) thereby effecting movement of the ADV. The movement that is effected can be proportionate to the control command. For example, a value of the control command will determine how much the ADV accelerates, turns, or brakes, in response to the control command. This process can be performed during driving, to dynamically adjust ADV control according to the relevant scenario.

Figure 6:
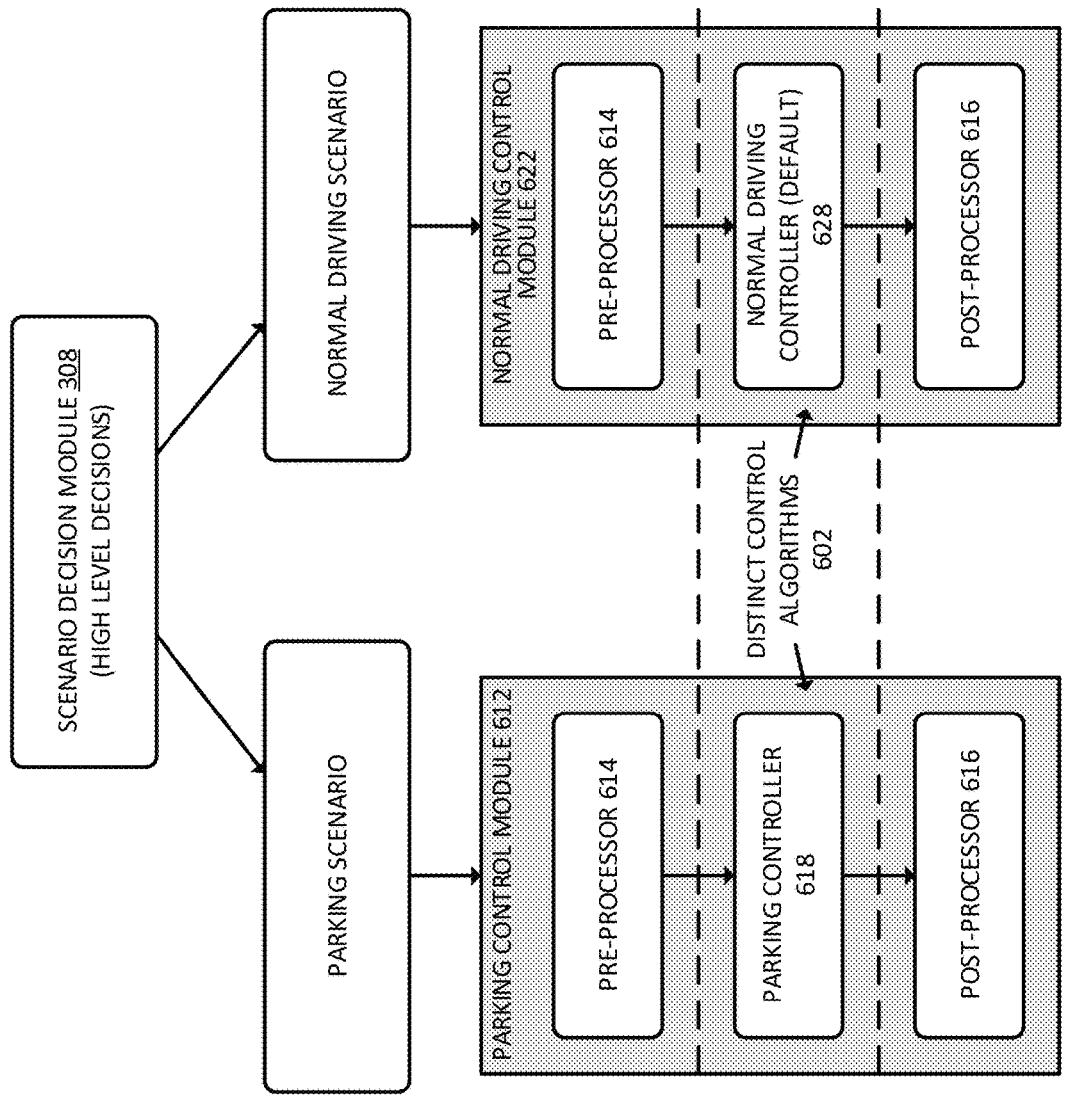
FIG. 6 shows an example parking control and normal driving control module, according to one embodiment.

Referring to FIG. 6, a system having a modular hot-plugging control module is shown according to one embodiment. A scenario decision module 308 can make a high level decision as to which ADV driving scenario is currently relevant to the ADV. The current scenario can be selected among a plurality of scenarios. These scenarios can be pre-determined and stored in computer memory (e.g., as data and/or computer instructions). In some embodiments, as shown in FIG. 6, the plurality of scenarios includes a parking scenario, and a normal driving scenario. The scenario decision module can determine which scenario is relevant based a plurality of factors, for example, map data, vehicle location, vehicle direction, and vehicle speed.

For example, the factors may indicate that the vehicle is entering a designated parking area (e.g., a parking lot). In this case, the scenario decision module 308 can set the active scenario as 'parking scenario'. When the ADV leaves the designated parking area, or when the ADV is normally driving from one destination to another, the scenario decision module can set the active scenario to 'normal driving scenario'. In some embodiments, additional driving scenarios can be pre-determined and selected from.

The system includes a plurality of parking control modules (e.g., 612 and 622) that are 'hot-plugged' as the active ADV control module based on driving scenario, where control modules 612 and 622 may be implemented as a part of control module 306. Each control module can include a common pre-processor 614 and a common post-processor 616. Further, each module can have a distinct control algorithm 602 that generates control commands that are compatible with the type of scenario that the ADV is currently under. The parking controller 618 and normal driving controller 628 are examples of distinct control algorithms corresponding to different driving scenarios. Controllers 613 and 628 may be specific designed and configured to handle a corresponding scenario. However, they are configured with a common set of application programming interfaces (APIs). As a result, any controller can be plugged in and invoked to perform specific operations of the corresponding scenario. In some embodiments, the normal driving controller is a default controller. Accordingly, the normal driving scenario (e.g., on-lane driving scenario) is the default driving scenario, unless the scenario decision module determines otherwise.

The control commands are generated based on one or more control target inputs, such as a target location of the ADV, a current location of the ADV, a target speed of the ADV, a current speed of the ADV, a target heading of the ADV, and a current heading of the ADV. Each distinct control algorithm may generate the control command to reduce a difference between a target parameter (location, speed, heading) and a current parameter (location, speed, heading) of the ADV, thereby tracking the target parameter. Each control algorithm can, however, track this target parameter more or less aggressively, depending on the current scenario. Some control algorithms can also limit controls or block certain behavior (e.g., reverse).

In some embodiments, under the parking scenario (e.g., open-space mode), the parking controller 618 can allow and generate throttle commands in forward and reverse. In contrast, the normal driving controller 628 does not allow throttle in reverse, because under normal driving conditions, going from one destination to another, the ADV should not drive in reverse.

In some embodiments, under the parking scenario, the parking controller 618 reduces differences between a) a target position of the ADV and a current position of the ADV, and/or b) a target heading of the ADV and a current heading of the ADV, more aggressively than a normal driving controller would, under the normal driving scenario.

In some embodiments, under the parking scenario, the parking controller 618 generates the control command to reduce differences between a target control parameter (e.g., speed of the ADV) and a current state of the ADV (e.g., the current speed of the ADV) less aggressively than the normal driving controller 628. The parking controller can penalize sudden changes in speed, to reduce acceleration of the ADV in confined spaces and parking lots where sudden accelerations can cause discomfort to a passenger and safety issues.

Figure 7:
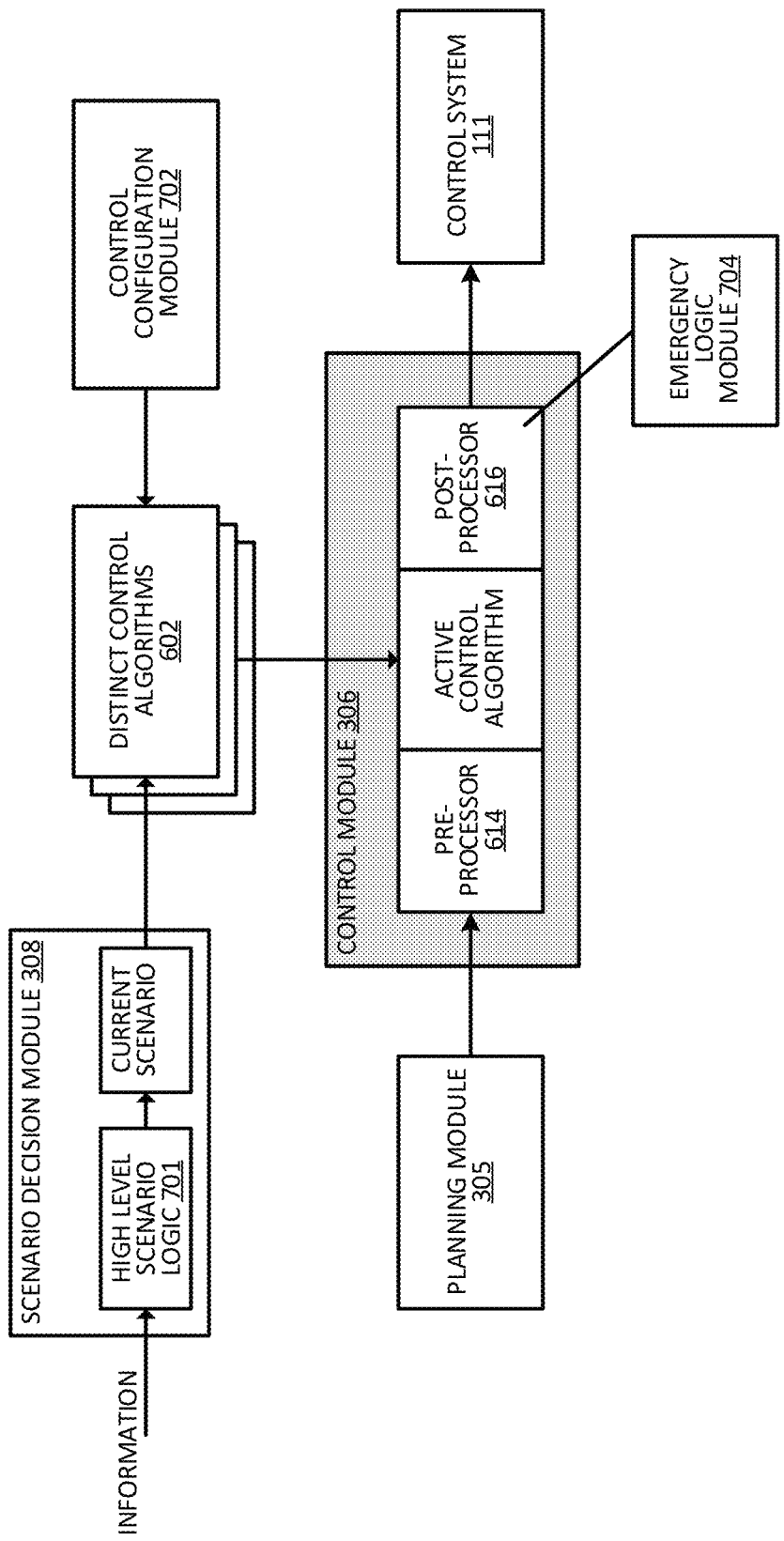
FIG. 7 shows a system for controlling an autonomous driving vehicle based on scenario with distinct control algorithms according to one embodiment.

Referring to FIG. 7, an ADV system is shown that modularly implements an appropriate distinct control algorithm 310 based on a current scenario of the ADV. The scenario decision module 308 includes high level scenario logic 701 that determines the current relevant scenario based on information (e.g., map data, vehicle location, vehicle direction, vehicle heading, etc.). This information can be generated by localization module 301, map and route information 311, sensor system 115, or other modules that are part of perception and planning system 110 as shown in FIG. 3A. This information can be accessed through a vehicle chassis channel, e.g., a CAN bus, or other communication protocol that connects vehicle controllers and actuators to facilitate communication.

Each of the control algorithms can be associated with and communicatively coupled to a common pre-processing module 614 and common post-processing module 616. These modules can each implement respective protocols.

For example, the pre-processing protocol can read the current scenario and retrieve control target inputs (e.g., from vehicle localization and/or perception, vehicle planning, or the vehicle chassis channel). The pre-processing protocol can also determine which of the distinct control algorithms 602 to load as the active control algorithm. This active control algorithm, once loaded, then processes the control target inputs based on the active control algorithm's unique control algorithm.

The post-processing protocol can format and output the control command onto a vehicle communication bus (e.g., vehicle chassis channel). These control commands can be received by relevant units of the control system 111 (see FIG. 2). For example, the control commands, which can be one or more of a throttle command, a steering command, or a braking command, can each respectively be received by a throttle actuator, a steering actuator, or a braking actuator, to effect a corresponding and proportionate movement of the ADV.

In some embodiments, the post processor module can include emergency logic 704. In response to an emergency condition, the post processing protocol can output an emergency command that overrides the control command. For example, if the emergency logic determines, based on information received from perception and planning, that an emergency condition is present (e.g., collision avoidance, sensed vehicle damage, or other emergency condition), then the emergency logic may generate one or more override commands that cause the ADV to slow down, pull over to the side, and/or come to a stop.

In some embodiments, control configuration 702 stores parameters that define the control behavior of each distinct control algorithm. These parameters can be set and modified though a) an application programming interface, b) user settings, and/or c) a writeable file stored in memory. The control configuration can be then drawn from during runtime or written into machine instructions during compile-time, which provides a convenient way to modify and manage each control algorithm.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method for operating an autonomous driving vehicle (ADV), the method comprising:
    perceiving a driving environment surrounding the ADV;
    determining a current scenario of the ADV from a plurality of driving scenarios that includes a parking scenario and a normal driving scenario, based on the driving environment;
    based on the current scenario, selecting a control algorithm among a plurality of distinct control algorithms, each of the control algorithms being associated with at least one of the driving scenarios;
    generating a control command with the selected control algorithm by invoking a respective controller corresponding to the selected control algorithm from a plurality of controllers associated with the driving scenarios, based on one or more control target inputs, wherein each of the plurality of controllers share a common application programming interface (API) that is used to invoke the respective controller, and wherein a first of the plurality of distinct control algorithms that corresponds to the parking scenario generates the control command to reduce differences between a target heading of the ADV and a current heading of the ADV, more aggressively than a second of the plurality of distinct control algorithms that corresponds to the normal driving scenario; and
    applying the control command to effect movement of the ADV, wherein each of the plurality of distinct control algorithms share in common, a common pre-processing protocol and a common post-processing protocol that formats and outputs the control command onto a vehicle communication bus, and wherein the common post processing protocol includes emergency logic that determines that an emergency condition is present, and in response to the emergency condition being present, the emergency logic generates an emergency command that overrides the control command.

2. The method of claim 1, wherein the current scenario of the ADV is determined based on at least two of: map information, current vehicle location, or current vehicle speed.

3. The method of claim 1, wherein under the parking scenario, the ADV is controlled to drive in any direction, and under the normal driving scenario the ADV is controlled to drive based on a driving lane.

4. The method of claim 1, wherein the first of the plurality of distinct control algorithms that corresponds to the parking scenario allows throttle in forward and reverse, and the second of the plurality of distinct control algorithms that corresponds to the normal driving scenario does not allow throttle in reverse.

5. The method of claim 1, wherein the parking scenario generates the control command to reduce differences between the target heading of the ADV and the current heading of the ADV on a frame-by-frame basis.

6. The method of claim 3, wherein a first of the plurality of distinct control algorithms that corresponds to the parking scenario generates the control command to reduce differences between a target speed of the ADV and a current speed of the ADV less aggressively than a second of the plurality of distinct control algorithms that corresponds to the normal driving scenario.

7. The method of claim 1, wherein the one or more control target inputs include at least one of: a target location of the ADV, a current location of the ADV, a target speed of the ADV, a current speed of the ADV, the target heading of the ADV, or a current heading of the ADV.

8. The method of claim 1, wherein the control command includes at least one of: a steering command, a throttle command, or a braking command.

9. The method of claim 1, wherein the common pre-processing protocol reads the current scenario to select the control algorithm based on the current scenario, and retrieves the one or more control target inputs from one or more of: a vehicle localization system, a vehicle planning system, or a chassis channel.

10. The method of claim 1, wherein the control command is received by a throttle actuator, a steering actuator, or a braking actuator.

11. The method of claim 10, wherein the control command causes the ADV to slow down.

12. The method of claim 1, wherein each of the plurality of distinct control algorithms are configurable through a configuration file stored in electronic memory.

13. A non-transitory machine-readable medium having instructions stored therein, which when executed by a processor, cause the processor to perform operations of operating an autonomous driving vehicle (ADV), the operations comprising:
    perceiving a driving environment surrounding the ADV;
    determining a current scenario of the ADV from a plurality of driving scenarios that includes a parking scenario and a normal driving scenario, based on the driving environment;
    based on the current scenario, selecting a control algorithm among a plurality of distinct control algorithms, each of the control algorithms being associated with at least one of the driving scenarios;
    generating a control command with the selected control algorithm by invoking a respective controller corresponding to the selected control algorithm from a plurality of controllers associated with the driving scenarios, based on one or more control target inputs wherein each of the plurality of controllers share a common application programming interface (API) that is used to invoke the respective controller, and wherein a first of the plurality of distinct control algorithms that corresponds to the parking scenario generates the control command to reduce differences between a target heading of the ADV and a current heading of the ADV, more aggressively than a second of the plurality of distinct control algorithms that corresponds to the normal driving scenario; and applying the control command to effect movement of the ADV, wherein each of the plurality of distinct control algorithms share in common, a common pre-processing protocol and a common post-processing protocol that formats and outputs the control command onto a vehicle communication bus, and wherein the common post processing protocol includes emergency logic that determines that an emergency condition is present, and in response to the emergency condition being present, the emergency logic generates an emergency command that overrides the control command.

14. The non-transitory machine-readable medium of claim 13, wherein the current scenario of the ADV is determined based on at least two of: map information, current vehicle location, current vehicle speed.

15. The non-transitory machine-readable medium of claim 13, wherein under the parking scenario, the ADV is controlled to drive in any direction, and under the normal driving scenario the ADV is controlled to drive based on a driving lane.

16. The non-transitory machine-readable medium of claim 1, wherein the first of the plurality of distinct control algorithms that corresponds to the parking scenario allows throttle in forward and reverse, and the second of the plurality of distinct control algorithms that corresponds to the normal driving scenario does not allow throttle in reverse.

17. A data processing system comprising:
a processor; and
memory, coupled to the processor, to store instructions which, when executed by the processor, cause the processor to perform operations of operating an autonomous driving vehicle (ADV), the operations including:
perceiving a driving environment surrounding the ADV;
determining a current scenario of the ADV from a plurality of driving scenarios that includes a parking scenario and a normal driving scenario, based on the driving environment;
based on the current scenario, selecting a control algorithm among a plurality of distinct control algorithms, each of the control algorithms being associated with at least one of the driving scenarios;
generating a control command with the selected control algorithm by invoking a respective controller corresponding to the selected control algorithm from a plurality of controllers associated with the driving scenarios, based on one or more control target inputs wherein each of the plurality of controllers share a common application programming interface (API) that is used to invoke the respective controller, and wherein a first of the plurality of distinct control algorithms that corresponds to the parking scenario generates the control command to reduce differences between a target heading of the ADV and a current heading of the ADV, more aggressively than a second of the plurality of distinct control algorithms that corresponds to the normal driving scenario; and applying the control command to effect movement of the ADV, wherein each of the plurality of distinct control algorithms share in common, a common pre-processing protocol and a common post-processing protocol that formats and outputs the control command onto a vehicle communication bus, and wherein the common post processing protocol includes emergency logic that determines that an emergency condition is present, and in response to the emergency condition being present, the emergency logic generates an emergency command that overrides the control command.

18. The data processing system of claim 17, wherein the current scenario of the ADV is determined based on at least two of: map information, current vehicle location, current vehicle speed.

19. The data processing system of claim 17, wherein under the parking scenario, the ADV is controlled to drive in any direction, and a normal driving scenario the ADV is controlled to drive based on a driving lane.

20. The data processing system of claim 17, wherein the first of the plurality of distinct control algorithms that corresponds to the parking scenario allows throttle in forward and reverse, and the second of the plurality of distinct control algorithms that corresponds to the normal driving scenario does not allow throttle in reverse.

* * * * *